No. 698,663. Patented Apr. 29, 1902.
T. DUNCAN.
ELECTRIC METER.
(Application filed Sept. 30, 1899. Renewed Oct. 28, 1901.)
(No Model.) 2 Sheets—Sheet 1.

Witnesses
Samuel A. Bachtel.
W. E. Marsh.

Inventor
Thomas Duncan
By his Attorneys
Carter & Grame

No. 698,663. Patented Apr. 29, 1902.
T. DUNCAN.
ELECTRIC METER.
(Application filed Sept. 30, 1899. Renewed Oct. 28, 1901.)

(No Model.) 2 Sheets—Sheet 2.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,663, dated April 29, 1902.

Application filed September 30, 1899. Renewed October 28, 1901. Serial No. 80,281. (No model.)

*To all whom it may concern:*

Be it known that I, THOMAS DUNCAN, of Chicago, in the county of Cook and State of Illinois, have invented certain new and useful Improvements in Electric Meters, (Case No. 62,) of which the following is a specification.

This invention relates to improvements in induction motor-meters for polyphase work, and particularly for bi or two phase systems of electrical distribution.

The principal object of the invention is to provide an improved method and means of insuring that the magnetic field representing the electromotive force of each circuit shall lag ninety degrees behind said electromotive force in order that the instrument may be accurate under all conditions of load inductance.

The invention consists in the matters herein set forth, and particularly pointed out in the appended claims.

Figure 1:
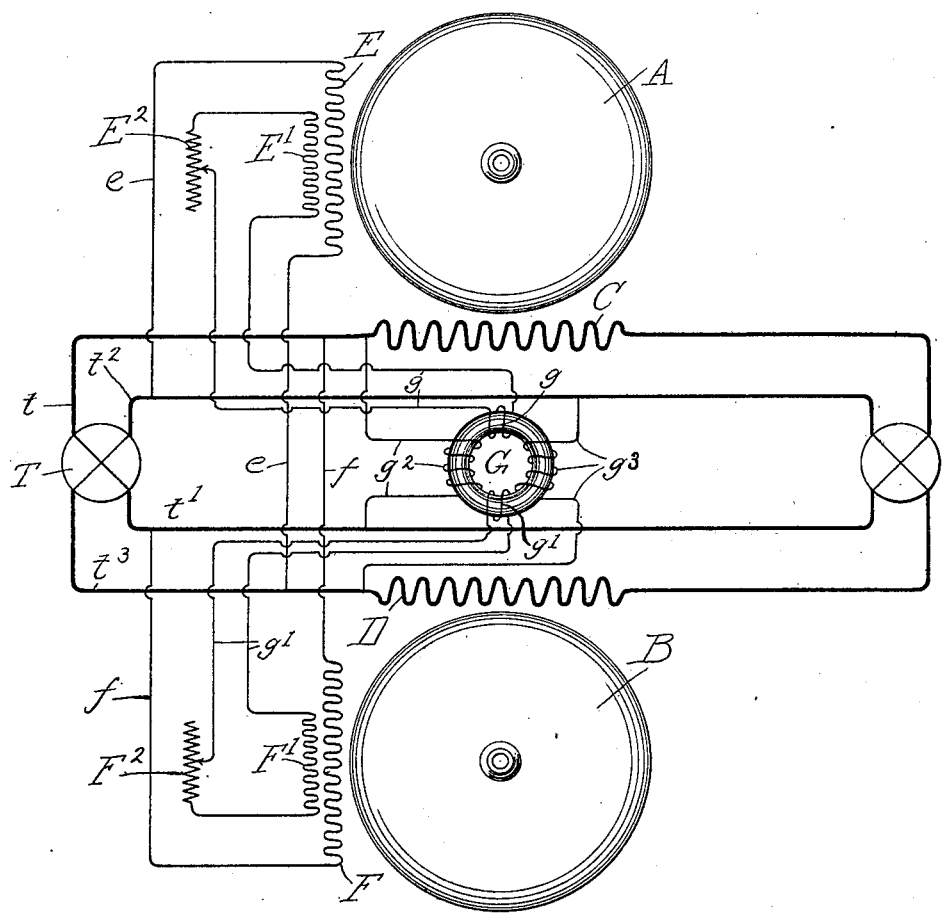
Figure 2:
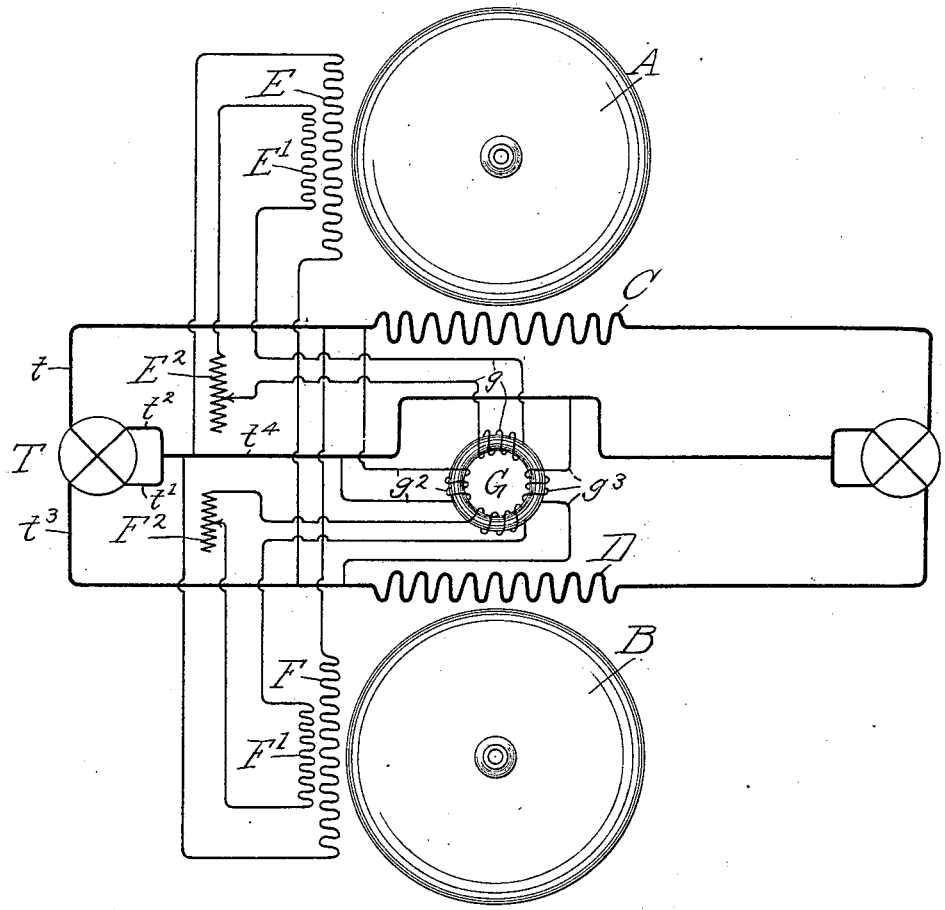

In the accompanying drawings, Figure 1 is a diagrammatic view showing the essential parts and connections of the meter as applied to a four-wire two-phase system. Fig. 2 is a similar view showing the application of the invention to a three-wire two-phase system of distribution.

Referring first to Fig. 1 of the drawings, A and B designate two closed circuit-armatures which in practice may be coupled up in any suitable manner and connected with a suitable mechanism for registering their rotations. Series field-coils C and D are mounted in inductive relation to the two armatures A and B, respectively, and are connected in series in separate circuits of the system, the field-coil C being herein shown as connected in series in the circuit $t\ t'$ of the two-phase generator T, while the other field-coil D is similarly connected in the other main circuit $t^2\ t^3$ of the generator T. Volt-coils E and F are also mounted in inductive relation to the armatures A and B, respectively, and are in each case connected in shunt between the main leads of the opposite circuit from that in which the corresponding series field-coils are connected, the volt-coil E of the armature A being connected in a shunt-circuit $e$ between the leads $t^2$ and $t^3$ of the circuit in which the field-coil D of the armature B is connected in series, while the volt-coil F of the armature B is connected in a shunt-circuit $f$ between the main leads $t$ and $t'$ of the circuit in which the field-coil C of the armature A is connected in series. Being thus connected, the volt-coil of each armature would be energized by a current lagging ninety degrees behind the impressed electromotive force of the circuit in which the series field-coil of that armature is connected if it were not for the self-inductance of the volt-coil, which tends to still further increase the lag. To counteract this tendency and insure a phase displacement of exactly ninety degrees, subsidiary volt-coils E' and F' are placed in inductive relation to the main volt-coils E and F and energized by being connected in the secondary circuits $g$ and $g'$ of a transformer G, which is energized by two primary circuits $g^2$ and $g^3$, connected in shunt between the leads of the two main circuits, the primary $g^2$ being shown as connected between the leads $t\ t'$ and the primary $g^3$ between the leads $t^2\ t^3$. The shunt-currents thus diverted from the main currents unite in inducing in the secondary circuit $g'$ and $g^2$ secondary currents which are displaced in phase from the currents of the main volt-coils, and the subsidiary coils E' and F' energized by such induced currents will, if properly proportioned, so modify the action of said main volt-coils E and F as to produce a resultant magnetic effect or volt-field which is displaced in phase in each case just the ninety degrees desired from the impressed electromotive force of the main circuit in which the corresponding series field-coil is connected. Adjustable resistance-coils E² and F² are suitably provided for the purpose of enabling the instrument to be readily calibrated and adjusted and are herein shown as connected in the circuits $g$ and $g'$ with the subsidiary coils E' and F', and the meter will be provided, after a manner well understood, with suitable magnetic drag mechanisms (not herein illustrated) for maintaining the revolutions proportional to the torque exerted.

In the three-wire two-phase system shown in Fig. 2 the two leads $t$ and $t^3$ of the main circuits are united in a single lead $t^4$, with which are made all connections previously described as made with either of said leads $t'$ and $t^2$ with precisely the same result as before. The same principles of construction and operation may also be obviously applied in other polyphase systems having circuits in quadrature.

I claim as my invention—

1. In an electric meter for two-phase systems, comprising a pair of revoluble armatures, series and volt coils for both armatures, the series coils of the two armatures being connected in the separate circuits of the system, and the volt-coil of each armature being connected between the leads of that circuit in which the field-coil of the other armature is connected, and subsidiary volt-coils applied to the main volt-coils and energized by secondary currents induced by primary shunts connected between the leads of both of the main circuits of the system, substantially as described.

2. An electric meter for two-phase systems, comprising a pair of revoluble armatures, series and volt coils for both armatures, the series coils of the two armatures being connected in separate circuits of the system and the volt-coil of each armature being connected between the leads of that circuit in which the field-coil of the other armature is connected, and subsidiary volt-coils applied to the main volt-coils and connected in the secondary circuits of a transformer having primary circuits connected in shunt between the leads of both of the main circuits of the system, substantially as described.

3. An electric meter for two-phase systems, comprising a pair of revoluble armatures, series and volt coils for both armatures, the series coils of the two armatures being connected in the separate circuits of the system, and the volt-coil of each armature being connected between the leads of that circuit in which the field-coil of the other armature is connected, subsidiary volt-coils applied to the main volt-coils and connected in the secondary circuits of a transformer having primary circuits connected in shunt between the leads of both of the main circuits of the system, and adjustable resistances connected in circuit with said subsidiary coils, substantially as described.

In testimony that I claim the foregoing as my invention I affix my signature, in presence of two subscribing witnesses, this 25th day of September, A. D. 1899.

THOMAS DUNCAN.

Witnesses:
   WILLIAM F. MEYER,
   JOS. M. KARTHOLL.